(12) United States Patent
He

(10) Patent No.: US 12,694,904 B2
(45) Date of Patent: Jul. 28, 2026

(54) TUTORIAL-BASED MULTIMEDIA RESOURCE EDITING METHOD AND APPARATUS, DEVICE, AND STORAGE MEDIUM

(71) Applicant: BEIJING ZITIAO NETWORK TECHNOLOGY CO., LTD., Beijing (CN)

(72) Inventor: Jiayi He, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 19 days.

(21) Appl. No.: 18/799,270

(22) Filed: Aug. 9, 2024

(65) Prior Publication Data

US 2024/0404560 A1 Dec. 5, 2024

Related U.S. Application Data

(63) Continuation-in-part of application No. 18/343,209, filed on Jun. 28, 2023, now abandoned, which is a
(Continued)

(30) Foreign Application Priority Data

Dec. 29, 2020 (CN) .......................... 202011598483.1

(51) Int. Cl.
| | |
|---|---|
| *G11B 27/031* | (2006.01) |
| *G06F 9/451* | (2018.01) |
| *G09B 5/06* | (2006.01) |

(52) U.S. Cl.
CPC ............ *G11B 27/031* (2013.01); *G06F 9/453* (2018.02); *G09B 5/065* (2013.01)

(58) Field of Classification Search
CPC ........ G11B 27/031; G06F 9/453; G09B 5/065
(Continued)

(56) References Cited

U.S. PATENT DOCUMENTS

| | | | |
|---|---|---|---|
| 5,601,432 A | 2/1997 | Bergman | |
| 7,878,808 B1 * | 2/2011 | Stumm | .................... G09B 5/12 |
| | | | 434/350 |

(Continued)

FOREIGN PATENT DOCUMENTS

| | | |
|---|---|---|
| CN | 105005430 A | 10/2015 |
| CN | 106657601 A | 5/2017 |

(Continued)

OTHER PUBLICATIONS

Extended European Search Report issued in European Patent Application No. 21913493.9, Mar. 27, 2024 (9 pages).
(Continued)

*Primary Examiner* — Peter S Vasat
*Assistant Examiner* — Stephen Alvesteffer
(74) *Attorney, Agent, or Firm* — Astute IP Law Group

(57) ABSTRACT

A method for editing multimedia resource based on a tutorial is provided. The method includes: acquiring a tutorial video; and playing the tutorial video on a resource editing page in a form of a floating window; where the tutorial video is configured to instruct a user to perform an editing operation on an imported multimedia resource on the resource editing page.

18 Claims, 6 Drawing Sheets

Related U.S. Application Data continuation of application No. PCT/CN2021/129742, filed on Nov. 10, 2021.

(58) Field of Classification Search
USPC .......................................................... 715/709
See application file for complete search history.

(56) References Cited

U.S. PATENT DOCUMENTS

| | | | |
|---|---|---|---|
| 10,129,310 B1 * | 11/2018 | Brunning | ............ H04L 41/0806 |
| 2003/0098863 A1 | 5/2003 | Fujita | |
| 2009/0063969 A1 * | 3/2009 | White | ................ H04N 7/17318 |
| | | | 348/E7.083 |
| 2010/0054706 A1 * | 3/2010 | McCrossan | ........ G11B 20/1262 |
| | | | 348/565 |
| 2010/0218100 A1 | 8/2010 | Simon | |
| 2012/0115122 A1 | 5/2012 | Bruce et al. | |
| 2013/0129316 A1 * | 5/2013 | Dontcheva | ............. G11B 27/34 |
| | | | 386/E9.011 |
| 2014/0310596 A1 | 10/2014 | Lafreniere et al. | |
| 2016/0065880 A1 | 3/2016 | Pearson et al. | |
| 2017/0102938 A1 | 4/2017 | Seigel | |
| 2017/0195613 A1 | 7/2017 | Yang | |
| 2020/0126291 A1 | 4/2020 | Nguyen et al. | |
| 2021/0264952 A1 * | 8/2021 | Zhu | .......................... G06N 5/01 |

FOREIGN PATENT DOCUMENTS

| | | |
|---|---|---|
| CN | 108108214 A | 6/2018 |
| CN | 108307232 A | 7/2018 |
| CN | 111770288 A | 10/2020 |
| CN | 112073649 A | 12/2020 |

OTHER PUBLICATIONS

Office Action issued in Japanese Patent Application No. 2023-539926, Jul. 2, 2024, with machine translation (6 pages).

Kuhn, "A system for contextual tutorials and guided assistance", ip.com, ip.com Inc., West Henrietta, NY, US Feb. 22, 2008, XP 013123949, 10 pages.

International Search Report and Written Opinion, International Patent Application No. PCT/CN2021/129742, Feb. 15, 2022, with English translation of Search Report (11 pages).

Office Action issued in Chinese Patent Application No. 202011598483.1, Nov. 9, 2023, with machine translation (14 pages).

Decision to Grant a Patent for Japanese Patent Application No. 2023-539926, mailed on Nov. 5, 2024, 5 pages.

Office Action for Singaporean Patent Application No. 11202305059S, mailed on Oct. 24, 2024, 9 pages.

* cited by examiner

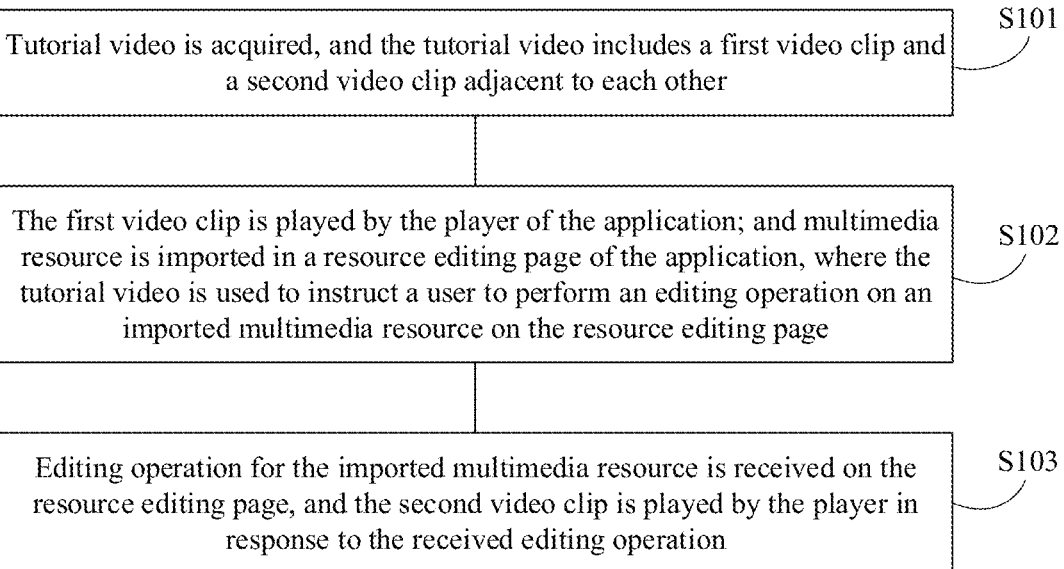

Tutorial video is acquired, and the tutorial video includes a first video clip and a second video clip adjacent to each other

S101

The first video clip is played by the player of the application; and multimedia resource is imported in a resource editing page of the application, where the tutorial video is used to instruct a user to perform an editing operation on an imported multimedia resource on the resource editing page

S102

Editing operation for the imported multimedia resource is received on the resource editing page, and the second video clip is played by the player in response to the received editing operation

Floating
window

TUTORIAL-BASED MULTIMEDIA RESOURCE EDITING METHOD AND APPARATUS, DEVICE, AND STORAGE MEDIUM

The present application is a continuation-in-part of U.S. application Ser. No. 18/343,209, filed on Jun. 28, 2023, which is a continuation of International Application No. PCT/CN2021/129742, filed on Nov. 10, 2021. The International Application claims priority to Chinese Patent Application No. 202011598483.1, titled "TUTORIAL-BASED MULTIMEDIA RESOURCE EDITING METHOD AND APPARATUS, DEVICE, AND STORAGE MEDIUM", filed with the China National Intellectual Property Administration on Dec. 29, 2020. All of the aforementioned applications are incorporated herein by reference in their entireties.

FIELD

The present disclosure relates to the field of data processing, and in particular to a method and apparatus for editing multimedia resource based on a tutorial, a device, and a storage medium.

BACKGROUND

With the rapid development of various technical fields, learning new knowledge and new technologies has become a daily routine for individuals. A common learning method to learn is to watch the tutorials. For example, video editing techniques can be learned by watching video editing tutorials, and image processing techniques can be learn by watching image processing tutorials.

In an actual learning process, the user opens the relevant operating software and learns the operation while watching the tutorial. Therefore, usually the user needs to use one device to play the tutorial while using another device to learn the operation, which is obviously a waste of device resources.

SUMMARY

In order to solve or at least partly solve the above technical problems, a method and apparatus for editing multimedia resource based on a tutorial, a device, and a storage medium are provided according to the present disclosure, which can realize a function of learning multimedia resource editing operations while watching tutorials via one device, so as to reduce the occupation of device resources.

In a first aspect, a method for editing multimedia resource based on a tutorial is provided according to the present disclosure. The method is applied to an application comprising a player, and the method includes:

acquiring a tutorial video, wherein the tutorial video comprises a first video clip and a second video clip adjacent to each other;

playing the first video clip by the player of the application; and importing multimedia resource in a resource editing page of the application, wherein the tutorial video is configured to instruct a user to perform an editing operation on an imported multimedia resource on the resource editing page; and receiving an editing operation for the imported multimedia resource on the resource editing page; and playing the second video clip by the player in response to the received editing operation.

In a second aspect, a non-transitory computer readable storage medium is provided according to the present disclosure, and instructions are stored in the computer readable storage medium, where the instructions when executed by a terminal device, cause the terminal device to implement the above method.

In a third aspect, a device is provided according to the present disclosure, the device includes: a memory; a processor; and a computer program stored in the memory and executable on the processor. When the computer program executed by the processor, the processor implements the above method.

BRIEF DESCRIPTION OF THE DRAWINGS

The drawings herein are incorporated into the specification and constitute a part of the specification, which show embodiments which comply with the present disclosure. The drawings and the specification are used as a whole to explain the principle of the present disclosure.

In order to more clearly illustrate the embodiments of the present disclosure or the technical solutions in the conventional technology, the drawings used in the description of the embodiments or the conventional technology are briefly introduced below. It is apparent that, for those skilled in the art, other drawings can be obtained according to the provided drawings without any creative effort.

FIG. 1 is a flow chart of a method for editing multimedia resource based on a tutorial according to an embodiment of the present disclosure;

DETAILED DESCRIPTION OF EMBODIMENTS

Figure 2:
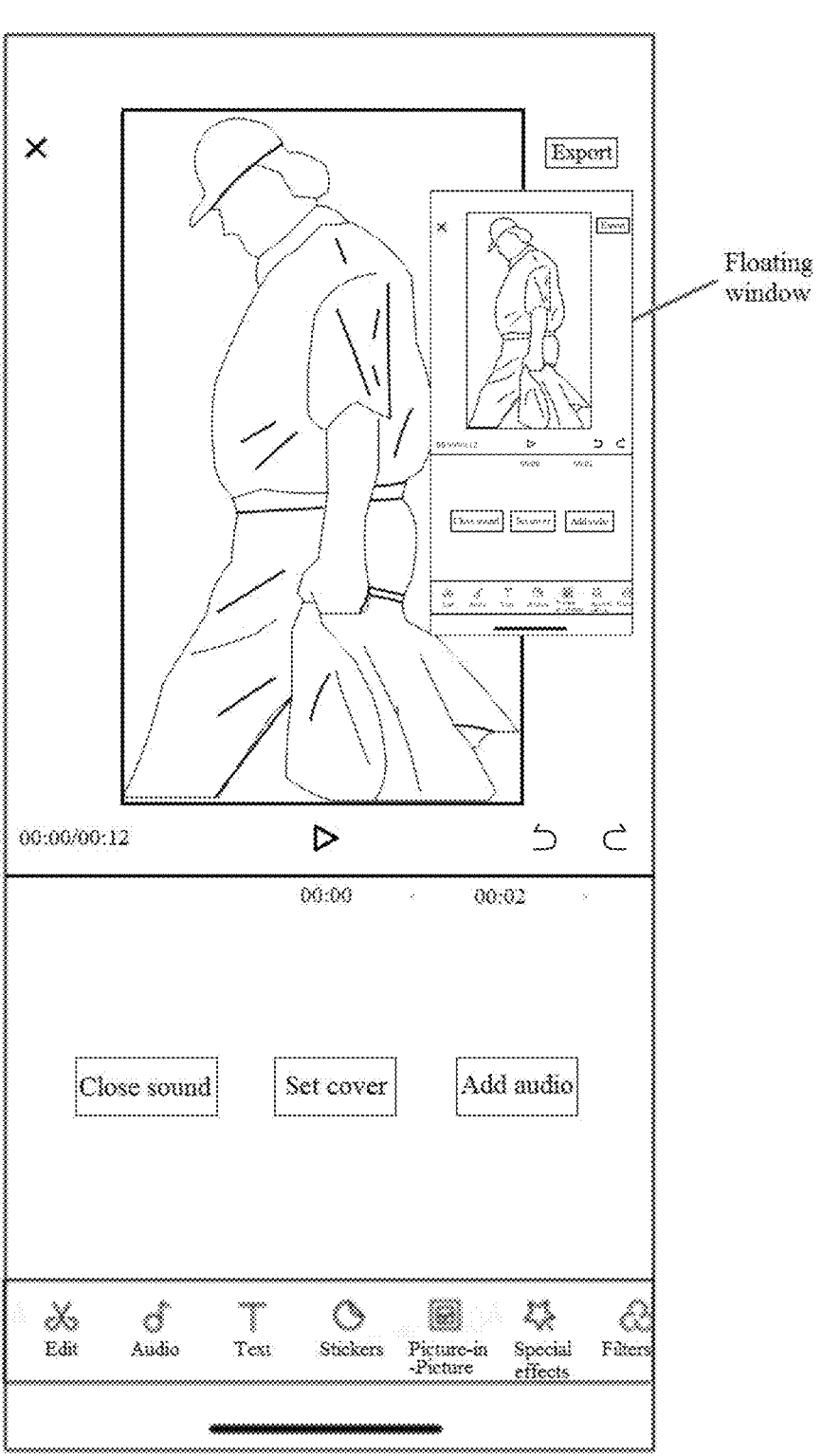
FIG. 2 is a schematic effect diagram of an audio and video editing page according to an embodiment of the present disclosure.

In order to understand the above purposes, features, and advantage of the present disclosure more clearly, the technical solutions according to the present disclosure will be further described. It should be noted that the embodiments of the present disclosure and the features in the embodiments may be combined with each other if there is no conflict.

In the following description, numerous specific details are set forth in order to provide thorough understanding of the present disclosure. However, the present disclosure may also be implemented in other ways different from those described here. Obviously, the embodiments in the specification are only a part of the embodiments of the present disclosure, rather than all the embodiments.

A common method for learning the multimedia resource editing is to watch the tutorials to learn the editing method for multimedia resources. However, in the existing technology, at least two devices are required to complete the function of learning multimedia resources editing while watching tutorials. Specifically, one device is used to play the tutorial video, and another device is used to open editing software of the multimedia resource. In this way, the user may operate the editing software of the multimedia resource while watching the tutorial video to finally achieve the purpose of learning multimedia resource editing via the tutorial video.

In order to reduce the waste of device resources, a method for editing multimedia resource based on a tutorial is provided according to the present disclosure. Firstly, the tutorial video is acquired, and then the tutorial video is played on a resource editing page in a form of a floating window. The tutorial video is used to instruct a user to perform an editing operation on an imported multimedia resource on the resource editing page. In this way, only one device is used to play the tutorial video and edit multimedia resources, which can reduce the occupation of device resources.

Based on this, a method for editing multimedia resource based on a tutorial is provided according to an embodiment of the present disclosure. Referring to FIG. 1, FIG. 1 illustrates a flow chart of a method for editing multimedia resource based on a tutorial according to an embodiment of the present disclosure. The method is applicable to an application including a player. The method includes steps S101 and S102 as follows.

In S101, a tutorial video is acquired, and the tutorial video includes a first video clip and a second video clip adjacent to each other.

In an embodiment of the present disclosure, the tutorial video refers to display an editing process for a certain effect on a multimedia resource in a form of a video, and the purpose of which is to guide the user to learn. The tutorial video may include multiple video clips. The tutorial video may be divided into multiple video clips based on the editing process for the effect on the multimedia resource. In an embodiment, each video clip may include an editing process for one effect on the multimedia resource. In another embodiment, the video clip may include an editing process for at least two effects on the multimedia resource.

The tutorial video may include a tutorial video for audio and video editing, a tutorial video for image effect processing, and the like.

In S102, the first video clip is played by the player of the application; and multimedia resource is imported in a resource editing page of the application, where the tutorial video is used to instruct a user to perform an editing operation on an imported multimedia resource on the resource editing page.

In an embodiment of the present disclosure, the resource editing page may be an audio and video editing operation page, an image effect processing page and the like.

In practical application, the acquired tutorial video is played on the resource editing page in the form of the floating window. Thus, the user can learn to edit the imported multimedia resource on the resource editing page through the tutorial video being played. The multimedia resource may include image resource, audio and video resource and the like.

In S103, an editing operation for the imported multimedia resource is received on the resource editing page, and the second video clip is played by the player in response to the received editing operation.

Taking the audio and video editing page as an example, FIG. 2 illustrates a schematic effect diagram of an audio and video editing page according to an embodiment of the present disclosure. As shown in FIG. 2, the tutorial video is played on the audio and video editing page in the form of the floating window. The user may perform an editing operation on the imported audio and video resource on the audio and video editing page, based on the tutorial video in the process of playing the tutorial video. In this way, the function of learning the audio and video editing while watching the tutorial video on one application can be achieved.

In the method for editing the multimedia resource based on the tutorial according to the present disclosure, the tutorial video is played on the resource editing page in the form of the floating window, which can instruct a user to perform an editing operation on an imported multimedia resource on the resource editing page. In this way, the function of learning the multimedia resource editing while watching the tutorial video on only one application can be achieved in the embodiment of the present disclosure, which can reduce the occupation of device resources.

On the basis of the above embodiments, a method for editing multimedia resource based on a tutorial is further provided according to the present disclosure. In an embodiment, the tutorial video is played on the display interface of the application. In response to a trigger operation for an editing entry on the display interface of the application, the player is invoked and the tutorial video is played in the player in the form of the floating window; and the resource editing page is displayed on the display interface of the application. In this way, the tutorial video is played on the resource editing page in the form of the floating window, thereby instructing the user to perform an editing operation on an imported multimedia resource on the resource editing page.

Figure 3:
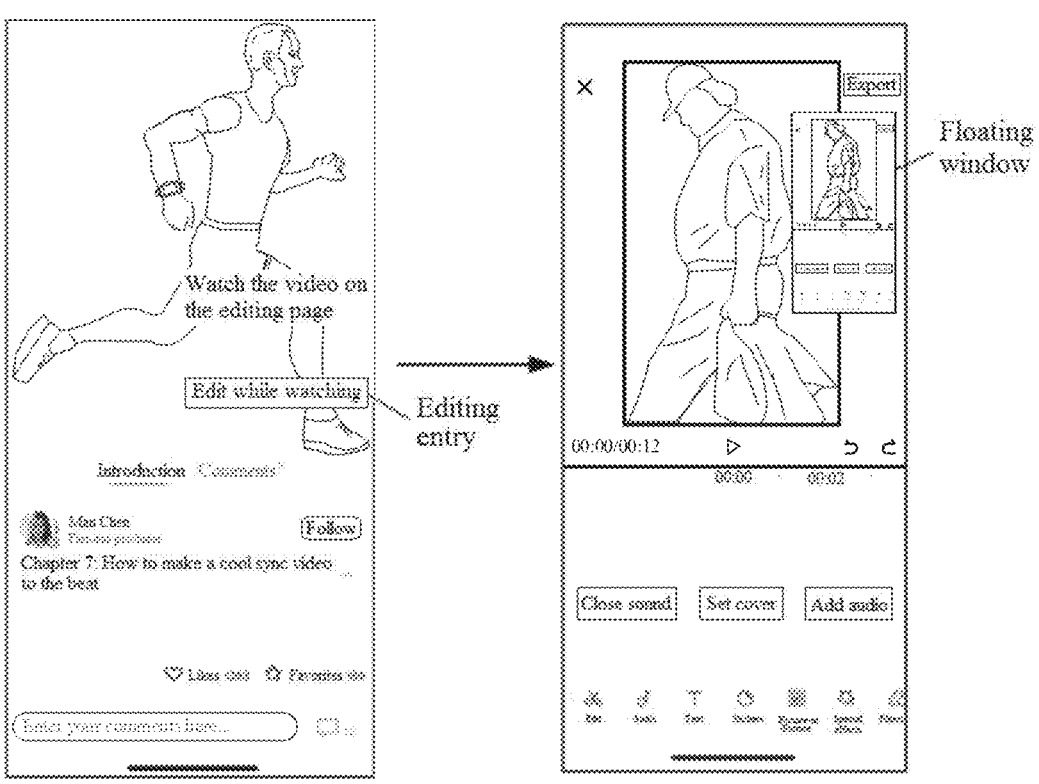
FIG. 3 is a schematic effect diagram of jumping from a tutorial playing page to a resource editing page according to an embodiment of the present disclosure.

FIG. 3 illustrates a schematic effect diagram of jumping from a tutorial playing page to a resource editing page according to an embodiment of the present disclosure. The first video clip is played on the display interface of the application. An editing entry is provided on the display interface of the application. As shown in FIG. 3, the editing entry, i.e., the "Edit while watching" button is provided on the display interface of the application. In response to the trigger operation, such as click operation, for an editing entry on the display interface of the application, the player is invoked and the first video clip is played in the player in the form of the floating window; and the resource editing page is displayed on the display interface of the application. In this way, the jump from the tutorial playing page to the resource editing page corresponding to the editing entry is triggered, and the tutorial video played on the display interface is acquired to play the tutorial video on the resource editing page in the form of the floating window. The resource editing page can be understood with reference to the schematic effect diagram of the audio and video editing page shown in FIG. 2.

In addition, a method for editing multimedia resource based on a tutorial is further provided according to an embodiment of the present disclosure. In the embodiment, a tutorial search box is provided on the resource editing page. The user can search for tutorial videos by inputting a keyword in the tutorial search box. Then, a tutorial video is selected from the searched tutorial videos and played on the resource editing page in the form of the floating window. Thus, user requirement of learning multimedia resource editing while watching the tutorial video on the same device is met.

It should be noted that this embodiment of the present disclosure does not limit the scenario of triggering the tutorial video played on the resource editing page in the form of the floating window.

In addition, in an embodiment of the present disclosure, before performing an editing operation on the resource editing page based on the tutorial video, the multimedia resource is imported on the resource editing page in advance.

Figure 4:
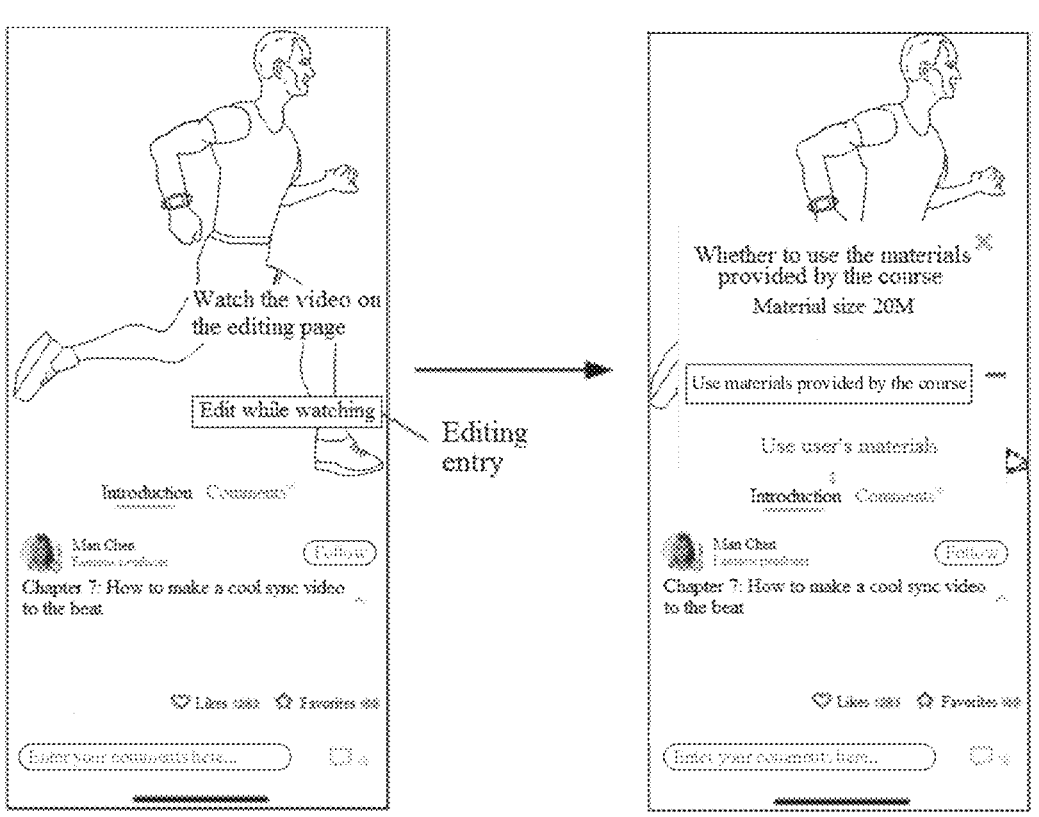
FIG. 4 is a schematic effect diagram of displaying a material source selection window after an editing entry is triggered according to an embodiment of the present disclosure.

In an optional implementation, after receiving a trigger operation for an editing entry on the display interface, a material source selection window is first displayed. FIG. 4 illustrates a schematic effect diagram of displaying a material source selection window after an editing entry is triggered according to an embodiment of the present disclosure. Referring to FIG. 4, at least two types of material sources are displayed on the material source selection window, which includes "Use material provided by the course", i.e., tutorial-associated material, and "Use my own material", i.e., user personal resource. Specifically, the tutorial-associated material refers to multimedia resource carried in the imported tutorial video. The user personal resource refers to importing user personal multimedia resource.

In an optional implementation, the author of the tutorial video can associate materials with the tutorial before posting the tutorial. In an embodiment, multimedia resource can be selected from the personal resources of the author, and posted in association with the tutorial video. In this way, users who study the tutorial video can use the associated multimedia resource to perform the editing operation.

In an actual application, in response to the trigger operation for the editing entry on the tutorial playing page, a material source selection window is displayed. If a selection operation for tutorial-associated material on the material source selection window is received from the user, a first material associated with the tutorial video is downloaded, and the first material is imported into the material editing page. If a selection operation for user personal resources on the material source selection window is received from the user, a second material selected from the user personal resources is imported into the resource editing page. Specifically, after a selection operation for user personal resources on the material source selection window is received from the user, a jump from the tutorial playing page to a display page of the user personal resources is performed. The user can select at least one material to import to the resource editing page.

It should be noted that the first material and the second material imported into the resource editing page are used as objects for the user to perform the editing operation on the resource editing page.

In another optional implementation, after receiving the trigger operation for the editing entry on the tutorial playing page, the tutorial playing page can be directly jumped to the display page of the user personal resources. After the user selects at least one material on the display page of the user personal resources, the at least one material is imported into the resource editing page, which is used as a multimedia resource to be edited.

In another optional implementation, after receiving the trigger operation for the editing entry on the tutorial playing page, the first material associated with the tutorial video can be directly downloaded, and be imported into the resource editing page.

It should be noted that, the manner for importing the multimedia resource to the resource editing page will not be limited in the embodiments of the present disclosure specifically.

In an embodiment of the present disclosure, in the process of playing the tutorial video on the resource editing page in the form of the floating window, the user can perform some operations, such as zooming in on or zooming out on the floating window, to adjust the display of the floating window to meet the user requirements.

In an optional implementation manner, when a zoom-in operation on the floating window is received, the floating window is zoomed in on the resource editing page. When a zoom-out operation on the floating window is received, the floating window is zoomed out on the resource editing page.

In another optional implementation, the user can also drag the floating window to adjust the display position of the floating window. Specifically, once a dragging operation for the floating window is received, the floating window is displayed in a preset area corresponding to the dragging direction of the dragging operation on the resource editing page. The preset area is independent from an area where the editing control is displayed on the resource editing page.

Figure 5:
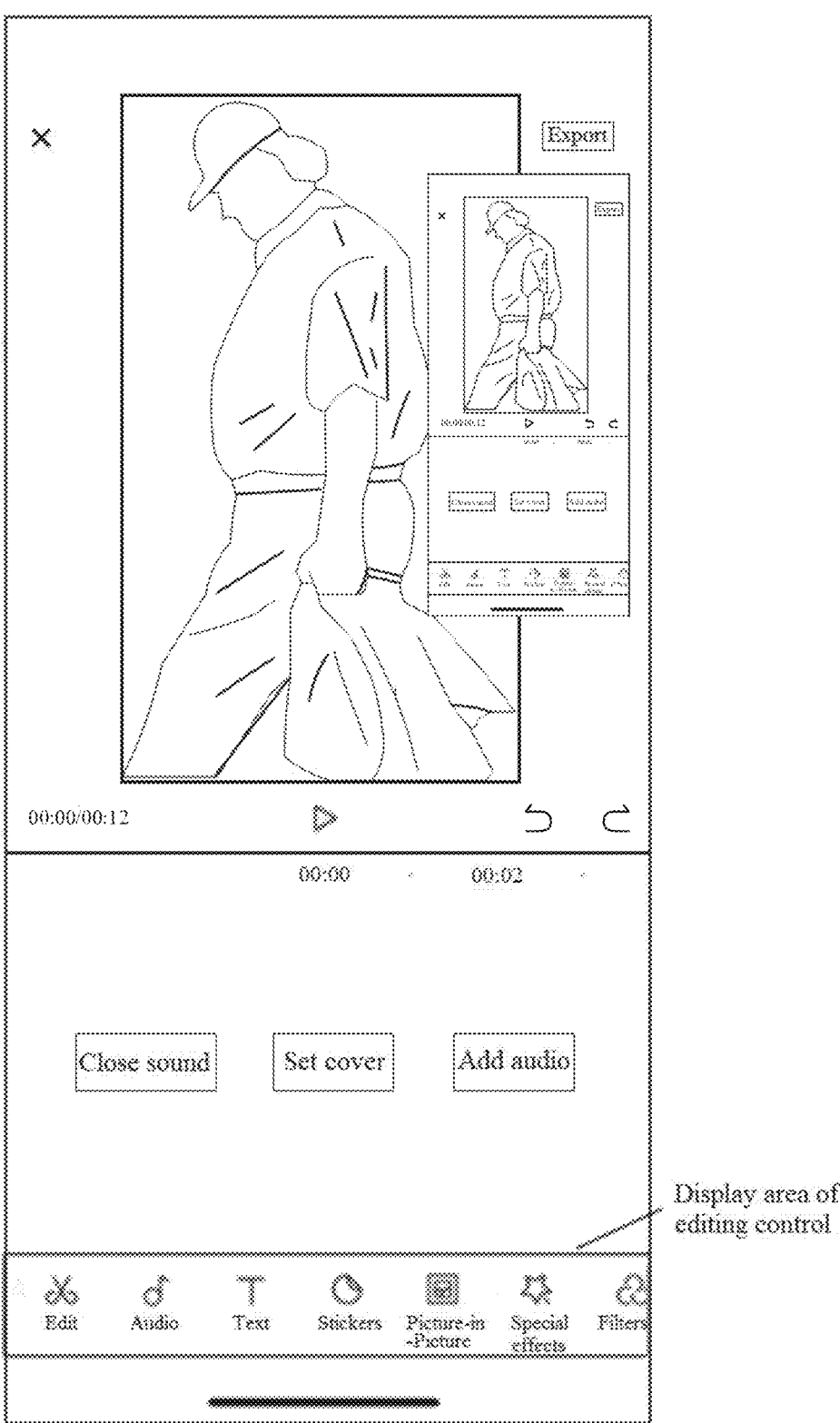
FIG. 5 is a schematic diagram of an audio and video editing page according to an embodiment of the present disclosure.

FIG. 5 is taken as an example. FIG. 5 is a schematic diagram of an audio and video editing page according to an embodiment of the present disclosure. When the floating window playing the tutorial video is dragged by the user, the dragged floating window cannot cover the display area of the editing control on the resource editing page, so as to ensure that the floating window does not interfere with the editing operation of the user on the imported multimedia resource on the resource editing page.

In an embodiment of the present disclosure, there are various implementations for performing the editing operation on the multimedia resource on the resource editing page based on the tutorial video played in the form of the floating window. An optional implementation of various implementations is provided according to an embodiment of the present disclosure.

In an embodiment, the tutorial video includes a first video clip and a second video clip adjacent to each other. In the process of playing the first video clip on the resource editing page in the form of the floating window, it is detected whether the editing operation indicated by the first video clip is completed on the resource editing page. As an example, the editing operation indicated by the first video clip include three editing operations in sequence, which are adding stickers, adding audio and adding special effects. Then, whether the above three editing operations indicated by the first video clip are completed on the resource editing page is detected, in the process of playing the first video clip. On detecting that the above three editing operations indicated by the first video clip have been completed on the resource editing page, the second video clip is played.

In an embodiment, the tutorial video may bound with multiple editing operations in advance. In one embodiment, each video clip in the tutorial video is bound with a respective editing operation. For example, in the case where the tutorial video includes adjacent first video clips and second video clips, a sticker adding operation can be bound with the first video clip in advance, and the audio adding operation and the effect adding operation can be bound with the second video clip in advance.

During the playback of the first video clip, the user performs the editing operation indicated in the first video segment on the imported multimedia resource on the resource editing page. If it is determined that the editing operation indicated by the first video clip has been completed on the resource editing page, the step of playing the second video clip may include: receiving the editing operation for the imported multimedia resource on the resource editing page; when the received editing operation is consistent with at least one preset editing operation bound to the first video clip, playing the second video clip.

For example, when the sticker adding operation is bound with the first video clip in advance, the user performs the sticker adding operation on the imported multimedia resource according to the indication of the first video clip. When it is detected that an editing operation has been performed on the edited multimedia resource and the editing operation is consistent with the sticker adding operation bound with the first video clip, the second video clip is played. Through the above implementation, the terminal can determine that the user has mastered the editing operation taught in the first video clip, that is, has mastered the editing operation pre-bound in the first video clip. Thus, the next video clip can be played for further learning.

In one implementation, at least one editing operation bound with the tutorial video may include at least one material. For example, when the sticker adding operation is bound with the first video clip, the sticker adding operation includes the sticker material. When the audio adding operation and the effect adding operation are bound with the second video clip, the audio adding operation includes audio material and the effect adding operation includes the effect material.

When the received editing operation is consistent with at least one preset editing operation bound with the first video clip, the step of playing the second video clip may include: obtaining the edited multimedia resource obtained by performing the editing operation on the resource editing page; and playing the second video clip in response to at least one material included in the edited multimedia resource.

In one embodiment, at least one material included in the edited multimedia resource means path information for storing at least one material included in the edited multimedia resource. In an embodiment, the edited multimedia resource may also include the at least one of location information of the at least one material in the edited multimedia resource, time information of the at least one material in the edited multimedia resource, and editing information of the material.

For example, when the sticker adding operation is bound in the first video clip in advance, the edited multimedia resource is obtained, and the materials in the edited multimedia resource are determined. If the edited multimedia resource includes sticker material corresponding to the sticker adding operation, it is determined that the editing operation which has been completed on the resource editing page is consistent with at least one preset editing operation bound with the first video clip, thereby playing the second video clip. In another embodiment, if the edited multimedia resource includes sticker material corresponding to the sticker adding operation and the location information of the sticker material indicates that the sticker material is located at the position indicated in the first video clip, it is determined that the editing operation which has been completed on the resource editing page is consistent with at least one preset editing operation bound with the first video clip, and then the second video clip is played.

It is took the audio adding operation bound with the first video clip in advance as an example. If the edited multimedia resource includes audio material corresponding to the audio adding operation, it is determined that the editing operation which has been completed on the resource editing page is consistent with at least one preset editing operation bound with the first video clip, and then the second video clip is played. In another embodiment, if the edited multimedia resource includes audio material corresponding to the audio adding operation and the time information of the audio material indicates that the audio material is added in the time slot indicated in the first video clip, the editing operation which has been completed on the resource editing page is consistent with at least one preset editing operation bound with the first video clip, and then the second video clip is played.

In another implementation, the step of playing the second video clip in the case that the editing operation which has been completed on the resource editing page is consistent with at least one preset editing operation bound with the first video clip, may include: in the process of playing the first video clip, monitoring the editing operation on the resource editing page; and determining that the editing operation which has been completed on the resource editing page is consistent with the editing operation bound in the first video clip.

It is took the audio adding operation bound with the first video clip in advance as an example. The step of determining that the editing operation which has been completed on the resource editing page is consistent with the editing operation bound in the first video clip includes: determining that the audio material added on the resource editing page is the audio material in the audio adding operation bound with the first video clip. In the case that the audio adding operation bound with the first video clip includes a clipping operation for the audio material, the step of determining that the editing operation has been completed on the resource editing page is consistent with the editing operation bound with the first video clip further includes: monitoring the editing operation completed on the resource editing page includes a clipping operation for the added audio material, where the edited audio material has the same duration as the audio material in the first video clip.

In an optional implementation, in the process of playing the first video clip, it is detected whether a preset operation in the editing operation indicated by the first video clip is completed on the resource editing page. For example, the preset operation may be the last operation in the editing operations indicated by the first video clip, such as the above operation of adding special effects. In this case, it is detected whether the above operation of adding special effects is completed on the resource editing page, in the process of playing the first video clip.

In addition, the preset operation may also be the first operation and the last operation in the editing operations indicated by the first video clip.

Through the above implementation, the terminal can determine that the user has mastered the editing operation taught in the first video clip by detecting the user's above-mentioned editing operation on the resource editing page. Thus, the next video clip can be played for further learning.

In addition, in an embodiment of the present disclosure, in response to receiving an editing completion operation for the multimedia resource on the resource editing page, a processing result corresponding to the multimedia resource is displayed in a user draft list. The processing result carries a tutorial identifier, and the tutorial identifier is used to indicate that the processing result is generated based on a tutorial video.

In practical applications, in the process of playing the tutorial video in the form of the floating window, the user processes the multimedia resource based on the tutorial video, to obtain a processing result. The processing result may be an edited video, an image after an effect operation and the like. After the user triggers the editing completion operation, the processing result of the user can be displayed in the user draft list. A tutorial identifier may be marked in the processing result, to indicate that the processing result is generated based on a tutorial video.

Figure 6:
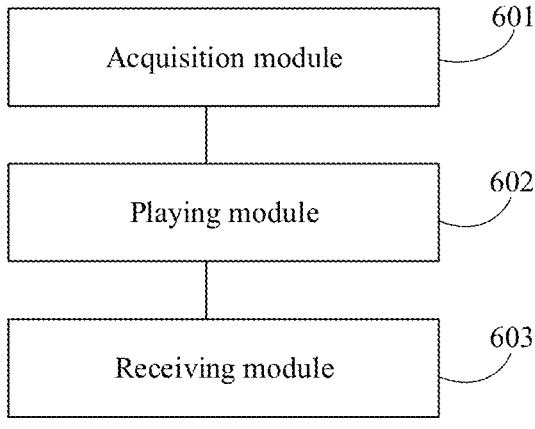
FIG. 6 is a schematic structural diagram of an apparatus for editing multimedia resource based on a tutorial according to an embodiment of the present disclosure.

Based on the same inventive concept as the above method embodiment, an apparatus for editing multimedia resource based on a tutorial is further provided according to the present disclosure. Referring to FIG. 6, FIG. 6 is a schematic structural diagram of an apparatus for editing multimedia resource based on a tutorial according to an embodiment of the present disclosure. The apparatus includes: an acquisition module 601, a playing module 602 and a receiving module 603.

The acquisition module 601 is configured to acquire a tutorial video, where the tutorial video comprises a first video clip and a second video clip adjacent to each other.

The playing module 602 is configured to play the first video clip by the player of the application; and import multimedia resource in a resource editing page of the application, wherein the tutorial video is configured to instruct a user to perform an editing operation on an imported multimedia resource on the resource editing page.

The receiving module 603 is configured to receive an editing operation for the imported multimedia resource on the resource editing page.

The playing module 602 is further configured to play the second video clip by the player in response to the received editing operation.

In an optional implementation, the playing module 602 is further configured to play the first video clip on a display interface of the application, wherein an editing entry is provided on the display interface of the application; and in response to a trigger operation for the editing entry, invoke the player and play the first video clip in the player in the form of the floating window, and display the resource editing page on the display interface of the application.

In an optional implementation, the apparatus further includes: a first display module, a downloading module and a first importing module.

The first display module is configured to display a material source selection window, in response to the trigger operation for the editing entry on the display interface of the application.

The downloading module is configured to download a first material associated with the tutorial video, in a case that a selection operation for a tutorial-associated material on the material source selection window is received, and import the first material into the resource editing page.

The first importing module is configured to import a second material selected from user personal resources into the resource editing page, in a case that a selection operation for user personal resource on the material source selection window is received.

In an optional implementation, the apparatus further includes: a second display module and a second importing module.

The second display module is configured to display a display page of user personal resource, in response to the trigger operation for the editing entry on the display interface of the application.

The second importing module is configured to import at least one material into the resource editing page, in response to a selection operation for the at least one material on the display page of user personal resource.

In an optional implementation, the apparatus further includes: a determining module and a triggering module.

The determining module is configured to determine whether an editing operation indicated by the first video clip is completed on the resource editing page, in a process of playing the first video clip.

The triggering module is configured to play the second video clip, in response to determining that the editing operation indicated by the first video clip has been completed on the resource editing page.

In an optional implementation, the first video clip is bonded with at least one preset editing operation, and the determining module is further configured to receive the editing operation for the imported multimedia resource on the resource editing page; and determine whether the received editing operation is in consistent with the at least one preset editing operation bonded with the first video clip. The triggering module is further configured to play the second video clip, in response to the received editing operation in consistent with the at least one preset editing operation bonded with the first video clip.

In an optional implementation, the at least one preset editing operation comprises at least one material. The determining module is further configured to obtain an edited multimedia resource obtained by performing the editing operation on the imported multimedia resource; and determine whether the material in the edited multimedia resource is a same as the material in the at least one preset editing operation bonded with the first video clip. The triggering module is further configured to play the second video clip, in response to determining that the material in the edited multimedia resource is the same as the material in the at least one preset editing operation bonded with the first video clip.

In an optional implementation, the determining module is further configured to determine whether a preset operation in the editing operation indicated by the first video clip is completed on the resource editing page, in the process of playing the first video clip.

In an optional implementation, the first video clip is bonded with a plurality of preset editing operations, and the preset operation in the editing operation indicated by the first video clip is a last operation of the plurality of preset editing operations.

In an optional implementation, the apparatus further includes: a second display module configured to display a processing result corresponding to the multimedia resource in a user draft list, in response to an editing completion operation for the multimedia resource on the resource editing page, where the processing result carries a tutorial identifier, and the tutorial identifier is configured to indicate that the processing result is generated based on a tutorial video.

In the apparatus for editing the multimedia resource based on the tutorial according to the embodiments of the present disclosure, the tutorial video is played on the resource editing page in the form of the floating window, so as to instruct the user to perform the editing operation on the imported multimedia resource on the resource editing page. Thus, the function of learning multimedia resource editing while watching the tutorial video on only one device can be achieved in the embodiments of the present disclosure, which can reduce the occupation of device resources.

In addition to the above methods and apparatuses, a computer readable storage medium is further provided according to an embodiment of the present disclosure.

Instructions are stored in the computer readable storage medium. The instructions, when executed by a terminal device, cause the terminal device to implement the method for editing the multimedia resource based on the tutorial described in the embodiments of the present disclosure.

Figure 7:
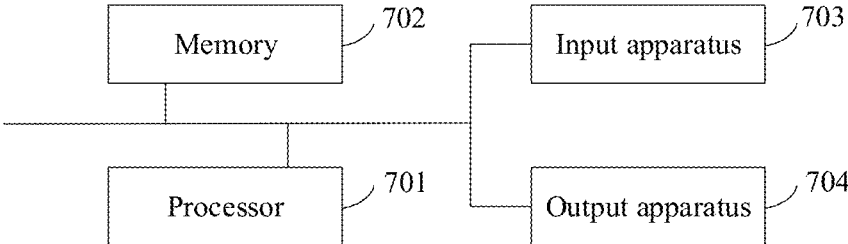
FIG. 7 is a schematic structural diagram of a device for editing multimedia resource based on a tutorial according to an embodiment of the present disclosure.

In addition, a device for editing multimedia resource based on a tutorial is further provided according to an embodiment of the present disclosure. Referring to FIG. 7, the device for editing the multimedia resource based on the tutorial may include: a processor 701, a memory 702, an input apparatus 703 and an output apparatus 704.

The device for editing the multimedia resource based on the tutorial may include one or more processors 701. One processor is taken as an example in FIG. 7. In some embodiments of the present disclosure, the processor 701, the memory 702, the input apparatus 703 and the output apparatus 704 may be connected through a bus or in other manner. In FIG. 7, a connection through the bus is taken as an example.

The memory 702 may be configured to store a software program and module. The processor 701 runs the software program and module stored in the memory 702, to perform various functional applications and data processing of the tutorial-based multimedia resource editing device. The memory 702 may mainly include a program memory area and a data memory area. An operating system, an application required by at least one function and the like are stored in the program memory area. In addition, the memory 702 may include a high-speed random access memory, and may further include a non-volatile memory, such as at least one disk storage device, a flash device or other volatile solid-state storage device. The input apparatus 703 may be configured to receive inputted number or character information, and generate a signal related to user settings and function control of the tutorial-based multimedia resource editing device.

In the embodiment, the processor 701 may load an executable file corresponding to the processes of one or more application programs into the memory 702 in response to an instruction. The processor 701 runs the application programs stored in the memory 702, thereby realizing various functions in the above tutorial-based multimedia resource editing device.

It should be noted that the relationship terms "first", "second" and the like herein are used for distinguishing an entity or operation from another entity or operation, but not intended to necessitate or imply an actual relationship or order between these entities or operations. Further, the terms "include", "comprise" or any variant thereof are intended to encompass nonexclusive inclusion such that a process, method, article or device including a series of elements includes not only those elements but also other elements which have not been listed definitely or an element(s) inherent to the process, method, article or device. Unless expressively limited otherwise, a process, method, article or device limited by "comprising/including a(n) . . . " does not exclude existence of another identical element in such process, method, article or device.

The above are only specific implementations of the present disclosure, such that those skilled in the art can understand or implement the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, rather, should be defined by the broadest scope consistent with the principle and novel features disclosed herein.

The invention claimed is:

1. A method for playing a video, applied to an application comprising a player, wherein the method comprises:

acquiring a tutorial video, wherein the tutorial video comprises a first video clip and a second video clip adjacent to each other, the first video clip is different from the second video clip, and the first video clip is bound with at least one editing operation;

playing the first video clip by the player of the application; and importing the multimedia resource in a resource editing page of the application; and receiving an editing operation for the multimedia resource on the resource editing page, wherein the resource editing page comprises at least one editing control for performing an editing operation on the multimedia resource, and the editing operation is performed on the multimedia resource based on an instruction of the tutorial video; and playing the second video clip by the player in response to the received editing operation, wherein receiving the editing operation for the multimedia resource on the resource editing page; and playing the second video clip by the player in response to the received editing operation comprises:

determining whether the received editing operation is consistent with the at least one editing operation bound with the first video clip, in a process of playing the first video clip; and playing the second video clip, in response to the received editing operation consistent with the at least one editing operation bound with the first video clip;

wherein the playing the first video clip by the player of the application comprises:

playing the first video clip in a floating window, wherein the floating window is displayed in a preset area, and the preset area is independent from a display area of the editing control in the resource editing page.

2. The method according to claim 1, wherein playing the first video clip by the player of the application; and importing the multimedia resource in a resource editing page of the application comprises:

playing the first video clip on a display interface of the application, wherein an editing entry is provided on the display interface of the application; and in response to a trigger operation for the editing entry, invoking the player and playing the first video clip in the player in the floating window, and displaying the resource editing page on the display interface of the application.

3. The method according to claim 2, wherein in response to the trigger operation for the editing entry, invoking the player and playing the first video clip in the player in the form of the floating window, and displaying the resource editing page on the display interface of the application comprises:

displaying a material source selection window, in response to the trigger operation for the editing entry on the display interface of the application;

downloading a first material associated with the tutorial video, in a case that a selection operation for a tutorial-associated material on the material source selection window is received, and importing the first material into the resource editing page; and importing a second material selected from a user personal resource into the resource editing page, in a case that a selection operation for the user personal resource on the material source selection window is received.

4. The method according to claim 2, wherein in response to the trigger operation for the editing entry, invoking the player and playing the first video clip in the player in the form of the floating window, and displaying the resource editing page on the display interface of the application comprises:

displaying a display page of a user personal resource, in response to the trigger operation for the editing entry on the display interface of the application; and importing at least one material into the resource editing page, in response to a selection operation for the at least one material on the display page of the user personal resource.

5. The method according to claim 1, wherein receiving the editing operation for the multimedia resource on the resource editing page, and playing the second video clip by the player in response to the received editing operation comprises:

determining whether an editing operation indicated by the first video clip is completed on the resource editing page, in a process of playing the first video clip; and playing the second video clip, in response to determining that the editing operation indicated by the first video clip has been completed on the resource editing page.

6. The method according to claim 5, wherein the determining whether the editing operation indicated by the first video clip is completed on the resource editing page in the process of playing the first video clip comprises:

determining whether a preset operation in the editing operation indicated by the first video clip is completed on the resource editing page, in the process of playing the first video clip.

7. The method according to claim 6, wherein the first video clip is bonded with a plurality of preset editing operations, and the preset operation in the editing operation indicated by the first video clip is a last operation of the plurality of preset editing operations.

8. The method according to claim 1, wherein the at least one preset editing operation comprises at least one material, and wherein determining whether the editing operation indicated by the first video clip is completed on the resource editing page, in a process of playing the first video clip comprises:

obtaining an edited multimedia resource obtained by performing the editing operation on the multimedia resource;

determining whether the material in the edited multimedia resource is same as the material in the at least one preset editing operation bonded with the first video clip; and wherein playing the second video clip, in response to the received editing operation consistent with the at least one preset editing operation bonded with the first video clip comprises:

playing the second video clip, in response to determining that the material in the edited multimedia resource is the same as the material in the at least one preset editing operation bonded with the first video clip.

9. The method according to claim 1, wherein after the playing the second video clip by the player in response to the received editing operation, the method further comprises:

displaying a processing result corresponding to the multimedia resource in a user draft list, in response to an editing completion operation for the multimedia resource on the resource editing page, wherein the processing result carries a tutorial identifier, and the tutorial identifier is used to indicate that the processing result is generated based on the tutorial video.

10. A non-transitory computer readable storage medium storing instructions, wherein the instructions, when executed by a terminal device, cause the terminal device to:

acquire a tutorial video, wherein the tutorial video comprises a first video clip and a second video clip adjacent to each other, the first video clip is different from the second video clip, and the first video clip is bound with at least one editing operation; and play the first video clip by the player of the application; and import a multimedia resource in a resource editing page of the application; and receive an editing operation for the multimedia resource on the resource editing page, wherein the resource editing page comprises at least one editing control for performing an editing operation on the multimedia resource, and the editing operation is performed on the multimedia resource based on an instruction of the tutorial video; and play the second video clip by the player in response to the received editing operation, wherein the instructions, when executed by a terminal device, cause the terminal device to:

determine whether the received editing operation is consistent with the at least one editing operation bound with the first video clip, in a process of playing the first video clip; and play the second video clip, in response to the received editing operation consistent with the at least one editing operation bound with the first video clip;

wherein the instructions, when executed by a terminal device, cause the terminal device further to:

play the first video clip in a floating window, wherein the floating window is displayed in a preset area, and the preset area is independent from a display area of the editing control in the resource editing page.

11. The non-transitory computer readable storage medium according to claim 10, wherein the instructions, when executed by the terminal device, cause the terminal device to:

play the first video clip on a display interface of the application, wherein an editing entry is provided on the display interface of the application; and in response to a trigger operation for the editing entry, invoke the player and play the first video clip in the player in the floating window, and display the resource editing page on the display interface of the application.

12. The non-transitory computer readable storage medium according to claim 11, wherein the instructions, when executed by the terminal device, cause the terminal device to:

display a material source selection window, in response to the trigger operation for the editing entry on the display interface of the application;

download a first material associated with the tutorial video, in a case that a selection operation for a tutorial-associated material on the material source selection window is received, and importing the first material into the resource editing page; and import a second material selected from a user personal resource into the resource editing page, in a case that a selection operation for the user personal resource on the material source selection window is received.

13. The non-transitory computer readable storage medium according to claim 11, wherein the instructions, when executed by the terminal device, cause the terminal device to:

display a display page of a user personal resource, in response to the trigger operation for the editing entry on the display interface of the application; and import at least one material into the resource editing page, in response to a selection operation for the at least one material on the display page of the user personal resource.

14. The non-transitory computer readable storage medium according to claim 10, wherein the instructions, when executed by the terminal device, cause the terminal device to:

determine whether an editing operation indicated by the first video clip is completed on the resource editing page, in a process of playing the first video clip; and play the second video clip, in response to determining that the editing operation indicated by the first video clip has been completed on the resource editing page.

15. The non-transitory computer readable storage medium according to claim 14, wherein the instructions, when executed by the terminal device, cause the terminal device to:

determine whether a preset operation in the editing operation indicated by the first video clip is completed on the resource editing page, in the process of playing the first video clip.

16. The non-transitory computer readable storage medium according to claim 15, wherein the first video clip is bonded with a plurality of preset editing operations, and the preset operation in the editing operation indicated by the first video clip is a last operation of the plurality of preset editing operations.

17. The non-transitory computer readable storage medium according to claim 10, wherein the at least one preset editing operation comprises at least one material, and wherein the instructions, when executed by the terminal device, cause the terminal device to:

obtain an edited multimedia resource obtained by performing the editing operation on the multimedia resource;

determine whether the material in the edited multimedia resource is same as the material in the at least one preset editing operation bonded with the first video clip; and play the second video clip, in response to determining that the material in the edited multimedia resource is the same as the material in the at least one preset editing operation bonded with the first video clip.

18. A device, comprising:

a memory;

a processor; and a computer program stored in the memory and executable on the processor, wherein the computer program, when executed by the processor, cause the processor to:

acquire a tutorial video, wherein the tutorial video comprises a first video clip and a second video clip adjacent to each other, the first video clip is different from the second video clip, and the first video clip is bound with at least one editing operation; and play the first video clip by the player of the application; and import a multimedia resource in a resource editing page of the application; and receive an editing operation for the multimedia resource on the resource editing page, wherein the resource editing page comprises at least one editing control for performing an editing operation on the multimedia resource, and the editing operation is performed on the multimedia resource based on an instruction of the tutorial video; and play the second video clip by the player in response to the received editing operation, wherein the computer program, when executed by the processor, cause the processor to:

determine whether the received editing operation is consistent with the at least one editing operation bound with the first video clip, in a process of playing the first video clip; and play the second video clip, in response to the received editing operation consistent with the at least one editing operation bound with the first video clip;

wherein the computer program, when executed by the processor, cause the processor further to:

play the first video clip in a floating window, wherein the floating window is displayed in a preset area, and the preset area is independent from a display area of the editing control in the resource editing page.

\* \* \* \* \*